US012665949B2

(12) United States Patent
Li

(10) Patent No.: US 12,665,949 B2
(45) Date of Patent: Jun. 23, 2026

(54) METHOD AND APPARATUS OF NETWORK CONFIGURATION FOR INTERNET-OF-THINGS DEVICE

(71) Applicants: Midea Group Co., Ltd., Foshan (CN); GD Midea Air-Conditioning Equipment Co., Ltd., Foshan (CN)

(72) Inventor: Bo Li, Foshan (CN)

(73) Assignees: MIDEA GROUP CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 461 days.

(21) Appl. No.: 18/199,324

(22) Filed: May 18, 2023

(65) Prior Publication Data

US 2023/0291799 A1 Sep. 14, 2023

Related U.S. Application Data

(63) Continuation of application No. PCT/CN2020/141070, filed on Dec. 29, 2020.

(30) Foreign Application Priority Data

Nov. 19, 2020 (CN) .......................... 202011307828.3

(51) Int. Cl.
*H04L 67/12* (2022.01)
*H04L 12/66* (2006.01)
*H04L 41/0816* (2022.01)

(52) U.S. Cl.
CPC .............. *H04L 67/12* (2013.01); *H04L 12/66* (2013.01); *H04L 41/0816* (2013.01)

(58) Field of Classification Search
CPC ..... H04L 67/12; H04L 12/66; H04L 41/0816; H04L 41/0889; H04L 65/102;
(Continued)

(56) References Cited

U.S. PATENT DOCUMENTS 9,054,961 B1 * 6/2015 Kim ...................... H04W 12/08
10,609,581 B2 * 3/2020 Lee ........................ H04W 12/08
(Continued)

FOREIGN PATENT DOCUMENTS

CN 105897691 A * 8/2016 ......... H04L 63/0876
CN 106507437 A * 3/2017 ............ H04W 84/12
(Continued)

OTHER PUBLICATIONS

Midea Group Co., Ltd., Extended European Search Report, EP Patent Application No. 20962319.8, Mar. 28, 2024, 11 pgs.
(Continued)

*Primary Examiner* — Shean Tokuta
(74) *Attorney, Agent, or Firm* — Morgan, Lewis & Bockius LLP

(57) ABSTRACT

Provided are a method and an apparatus of network configuration for an internet-of-things device. The method includes: establishing a neighborhood awareness channel between a terminal device and the IoT device; obtaining, by the terminal device, network configuration information of a gateway device stored in the terminal device; and transmitting, by the terminal device at a media access control layer, the network configuration information to the IoT device through the neighborhood awareness channel to allow the IoT device to connect to the gateway device via the network configuration information, and may improve an efficiency of network configuration for the IoT device.

20 Claims, 2 Drawing Sheets the terminal device establishes a neighborhood awareness channel with the IoT device — S110 the terminal device obtains network configuration information of the gateway device stored in the terminal device — S120 the terminal device transmits the network configuration information to the IoT device at the media access control layer via the neighborhood awareness channel — S130 the IoT device obtains the network configuration information of the gateway device from the terminal device at the media access control layer and through the neighborhood awareness channel — S140 the IoT device is connected to the gateway device through the network configuration information — S150

(58) Field of Classification Search

CPC ...... H04L 65/1069; H04W 4/70; H04W 4/50; H04W 8/005; H04W 40/22; H04W 40/24; H04W 48/08

See application file for complete search history.

(56) References Cited

U.S. PATENT DOCUMENTS

| | | | | |
|---|---|---|---|---|
| 10,880,817 | B2 * | 12/2020 | Wang | H04W 48/16 |
| 2010/0004021 | A1 * | 1/2010 | Lin | H04W 48/18 |
| | | | | 455/552.1 |
| 2014/0045536 | A1 * | 2/2014 | Sydir | H04W 4/021 |
| | | | | 455/456.5 |
| 2014/0304770 | A1 * | 10/2014 | Jung | H04W 12/122 |
| | | | | 726/2 |
| 2015/0141005 | A1 * | 5/2015 | Suryavanshi | H04W 12/06 |
| | | | | 455/434 |
| 2016/0029151 | A1 * | 1/2016 | Hara | H04B 5/20 |
| | | | | 455/41.1 |
| 2016/0072806 | A1 * | 3/2016 | Kim | H04W 12/50 |
| | | | | 726/5 |
| 2016/0315859 | A1 * | 10/2016 | Buesker | H04L 61/5007 |
| 2016/0353269 | A1 * | 12/2016 | Kasslin | H04L 67/303 |
| 2017/0085566 | A1 * | 3/2017 | Kim | H04L 63/0876 |
| 2017/0126499 | A1 * | 5/2017 | Salkintzis | H04L 67/563 |
| 2017/0208531 | A1 | 7/2017 | Huang et al. | |
| 2019/0052476 | A1 * | 2/2019 | Shu | H04W 4/70 |
| 2019/0223248 | A1 * | 7/2019 | Chandran | H04L 12/2803 |
| 2019/0246346 | A1 * | 8/2019 | Huang | H04L 12/2838 |
| 2019/0335519 | A1 * | 10/2019 | Ohkubo | H04W 76/14 |
| 2020/0007700 | A1 * | 1/2020 | Miyakawa | G06F 3/1236 |
| 2020/0111117 | A1 * | 4/2020 | Xiao | G06Q 20/401 |
| 2020/0136902 | A1 * | 4/2020 | Wang | H04L 63/0876 |
| 2020/0213936 | A1 * | 7/2020 | Fan | H04W 48/18 |
| 2022/0345576 | A1 * | 10/2022 | Suzaki | H04N 1/00503 |
| 2023/0068641 | A1 * | 3/2023 | Lu | H04W 76/10 |
| 2023/0093016 | A1 * | 3/2023 | Shi | H04L 41/12 |
| | | | | 370/329 |
| 2023/0129637 | A1 * | 4/2023 | Tzoreff | H04W 76/19 |
| | | | | 709/227 |
| 2023/0291799 | A1 * | 9/2023 | Li | H04W 40/24 |
| 2023/0337147 | A1 * | 10/2023 | Xu | H04W 4/023 |

FOREIGN PATENT DOCUMENTS

| | | | | | | |
|---|---|---|---|---|---|---|
| CN | 106600262 | A | * | 4/2017 | | G06Q 20/325 |
| CN | 106973381 | A | * | 7/2017 | | H04W 48/16 |
| CN | 107079402 | A | | 8/2017 | | |
| CN | 109151726 | A | | 1/2019 | | |
| CN | 109194722 | A | * | 1/2019 | | H04N 1/4406 |
| CN | 109246658 | A | | 1/2019 | | |
| CN | 109275125 | A | * | 1/2019 | | H04L 67/60 |
| CN | 109741585 | A | * | 5/2019 | | |
| CN | 109819426 | A | * | 5/2019 | | H04W 48/16 |
| CN | 110012462 | A | * | 7/2019 | | H04W 12/06 |
| CN | 110460995 | A | * | 11/2019 | | H04W 76/11 |
| CN | 106507437 | B | * | 12/2019 | | H04W 76/14 |
| CN | 110635959 | A | * | 12/2019 | | H04L 41/0823 |
| CN | 107147549 | B | * | 2/2020 | | H04L 12/2856 |
| CN | 110798493 | A | | 2/2020 | | |
| CN | 110971495 | A | * | 4/2020 | | H04L 67/12 |
| CN | 111182504 | A | * | 5/2020 | | H04W 12/068 |
| CN | 111246539 | A | * | 6/2020 | | H04L 12/2807 |
| CN | 111342985 | A | | 6/2020 | | |
| CN | 111343055 | A | * | 6/2020 | | H04W 48/16 |
| CN | 111628897 | A | * | 9/2020 | | H04W 60/00 |
| CN | 106973381 | B | * | 11/2020 | | H04W 48/20 |
| CN | 114598598 | A | * | 6/2022 | | H04L 41/0889 |
| EP | 3605955 | A1 | * | 2/2020 | | H04W 76/14 |
| EP | 4224889 | A1 | * | 8/2023 | | H04L 41/0806 |
| EP | 4250685 | A1 | * | 9/2023 | | H04L 41/0889 |
| ES | 3041317 | T3 | * | 11/2025 | | H04L 41/0816 |
| KR | 20140099808 | A | * | 8/2014 | | H04W 4/80 |
| RU | 2646390 | C1 | * | 3/2018 | | H04L 67/51 |
| TW | 201523225 | A | * | 6/2015 | | |
| WO | WO-2016013119 | A1 | * | 1/2016 | | H04W 76/30 |
| WO | WO 2016061402 | A1 | | 4/2016 | | |
| WO | WO-2016173178 | A1 | * | 11/2016 | | H04L 12/28 |
| WO | WO-2017008705 | A1 | * | 1/2017 | | H04L 9/40 |
| WO | WO-2017051497 | A1 | * | 3/2017 | | H04W 40/32 |
| WO | WO-2017193937 | A1 | * | 11/2017 | | H04W 8/005 |
| WO | WO-2019071522 | A1 | * | 4/2019 | | H04W 52/02 |
| WO | WO-2019071523 | A1 | * | 4/2019 | | H04M 1/73 |
| WO | WO-2020155360 | A1 | * | 8/2020 | | H04W 48/16 |
| WO | WO-2020223854 | A1 | * | 11/2020 | | G05B 19/04 |
| WO | WO-2021147686 | A1 | * | 7/2021 | | H04M 1/72406 |
| WO | WO-2021159708 | A1 | * | 8/2021 | | H04W 12/73 |
| WO | WO-2021164769 | A1 | * | 8/2021 | | H04W 12/50 |
| WO | WO-2022016672 | A1 | * | 1/2022 | | H04W 4/80 |
| WO | WO-2022105028 | A1 | * | 5/2022 | | H04L 41/0889 |
| WO | WO-2024022222 | A1 | * | 2/2024 | | H04W 12/71 |

OTHER PUBLICATIONS

Midea Group Co., Ltd., CN Office Action, CN Patent Application No. 202011307828.3, Dec. 20, 2022, 25 pgs.

Midea Group Co., Ltd., CN Office Action, CN Patent Application No. 202011307828.3, May 22, 2023, 22 pgs.

Midea Group Co., Ltd., ISRWO, PCT/CN2020/141070, Jul. 22, 2021, 6 pgs.

Midea Group Co., Ltd., IPRP, PCT/CN2020/141070, May 16, 2023, 5 pgs.

"Overview of WLAN Awareness (Wi Fi Aware)", Jun. 11, 2019, 19 pgs. Retrieved from the Internet: https://blog.csdn.net/qq_43804080/article/details/102943828.

"WifiAware Implementation and Protocol Model", 21 pgs., Retrieved from the Internet: https://developer.android.google.cn/guide/topics/connectivity/wifi-aware.

"WLAN Perception Overview", 17 pgs.

* cited by examiner

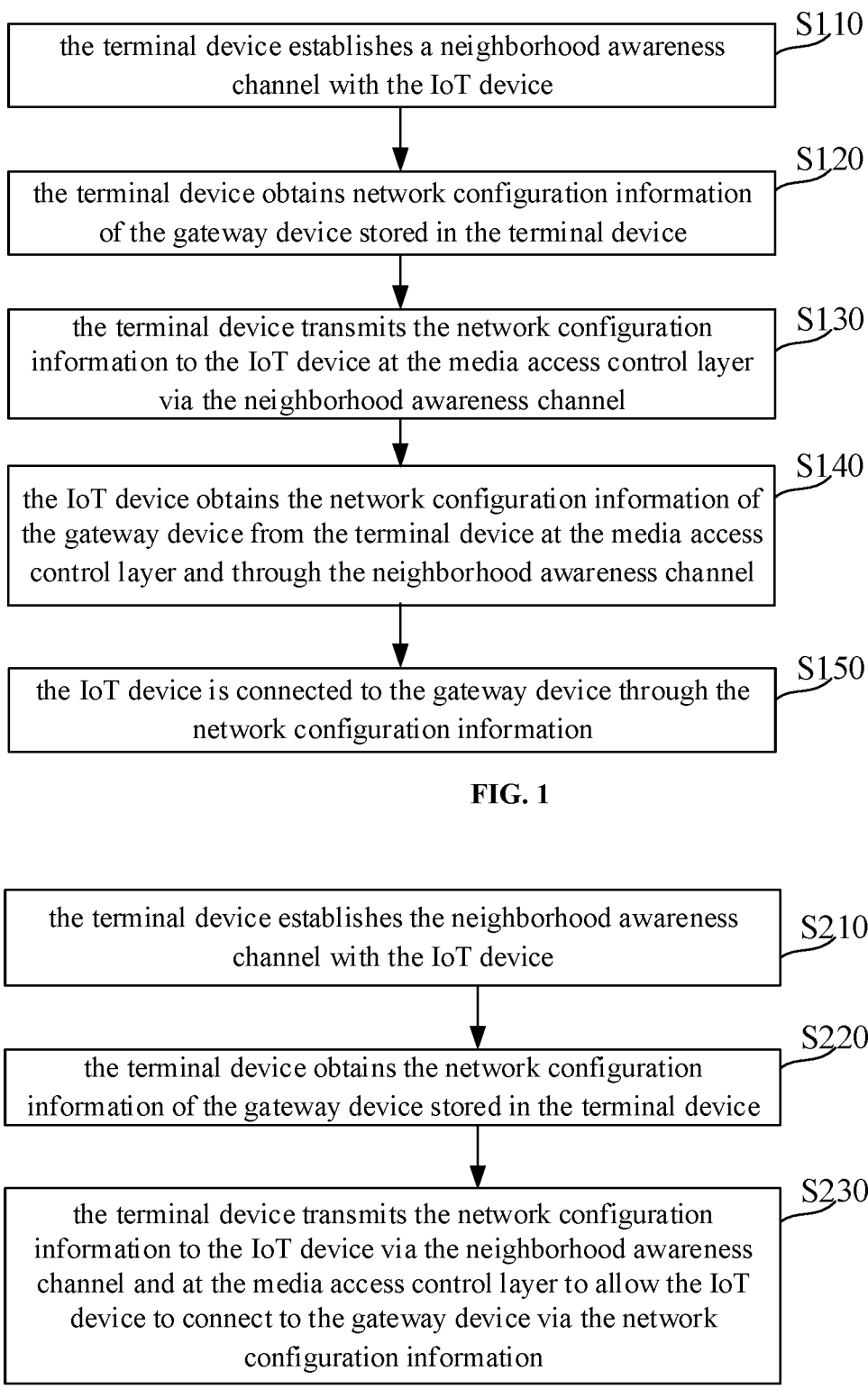

the terminal device establishes a neighborhood awareness channel with the IoT device
S110 the terminal device obtains network configuration information of the gateway device stored in the terminal device
S120 the terminal device transmits the network configuration information to the IoT device at the media access control layer via the neighborhood awareness channel
S130 the IoT device obtains the network configuration information of the gateway device from the terminal device at the media access control layer and through the neighborhood awareness channel
S140 the IoT device is connected to the gateway device through the network configuration information
S150

FIG. 1 the terminal device establishes the neighborhood awareness channel with the IoT device
S210 the terminal device obtains the network configuration information of the gateway device stored in the terminal device
S220 the terminal device transmits the network configuration information to the IoT device via the neighborhood awareness channel and at the media access control layer to allow the IoT device to connect to the gateway device via the network configuration information
S230

FIG. 2

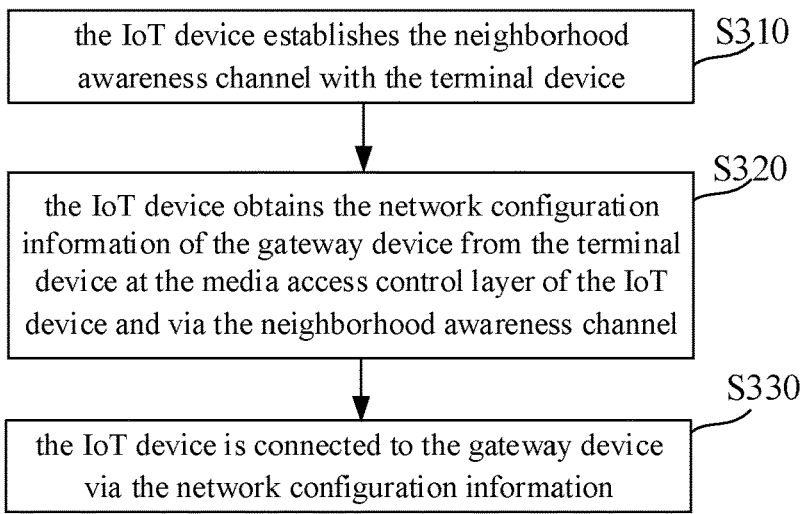

the IoT device establishes the neighborhood awareness channel with the terminal device    S310 the IoT device obtains the network configuration information of the gateway device from the terminal device at the media access control layer of the IoT device and via the neighborhood awareness channel    S320 the IoT device is connected to the gateway device via the network configuration information    S330

FIG. 3

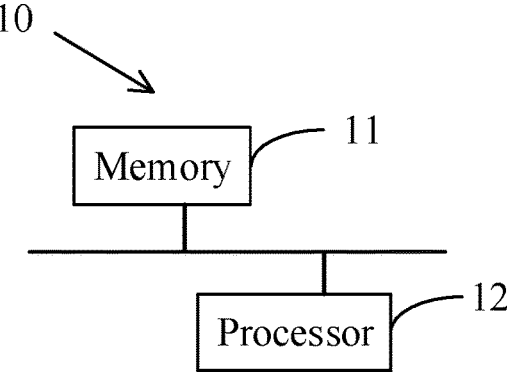

10

Memory    11

Processor    12

FIG. 4

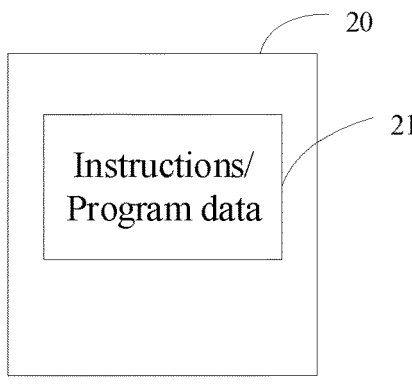

20

Instructions/ Program data    21

FIG. 5

METHOD AND APPARATUS OF NETWORK CONFIGURATION FOR INTERNET-OF-THINGS DEVICE

CROSS REFERENCE TO RELATED APPLICATIONS

The present disclosure is a continuation application of the International patent application No. PCT/CN2020/141070, filed on Dec. 29, 2020, which claims priority of Chinese patent application No. 202011307828.3, filed on Nov. 19, 2020, in the title of "METHOD AND APPARATUS OF NETWORK CONFIGURATION FOR INTERNET-OF-THINGS DEVICE", and the contents of which are incorporated herein by its entireties.

TECHNICAL FIELD

The present disclosure relates to the field of network configuration of internet-of-thing devices, and in particular to a method and an apparatus of network configuration for an internet-of-things device.

BACKGROUND

An internet-of-thing (IoT) device usually needs a gateway device to be connected to a server to achieve a IoT function of the IoT device. Therefore, the IoT device needs to obtain network configuration information of the gateway device firstly.

SUMMARY OF THE DISCLOSURE

The present disclosure provides a method and an apparatus for network configuration of internet-of-thing devices to improve an efficient of network configuration.

The present disclosure provides a method of network configuration for an Internet of Things (IoT) device, including:

establishing a neighborhood awareness channel between a terminal device and the IoT device;

obtaining, by the terminal device, network configuration information of a gateway device stored in the terminal device; and transmitting, by the terminal device at a media access control layer, the network configuration information to the IoT device through the neighborhood awareness channel to allow the IoT device to connect to the gateway device via the network configuration information.

The present disclosure further provides a method of network configuration for an Internet of Things (IoT) device, including:

establishing a neighborhood awareness channel between a terminal device and the IoT device;

obtaining, by the IoT device at a media access control layer of the IoT device, network configuration information from the terminal device through the neighborhood awareness channel; and connecting the IoT device to the gateway device via the network configuration information.

The present disclosure provides an electronic device, including: a processor. The processor is configured to execute instructions to perform the method as described in the above.

The present disclosure provides a computer readable storage medium, configured to store instructions/program data. The instructions/program data are capable of being executed to perform the method as described in the above.

According to the present disclosure, in some embodiments, the IoT device and the terminal device activates a neighborhood awareness function. The IoT device and the terminal device establish a neighborhood awareness channel. In this way, the IoT device may obtain the network configuration information of the gateway device sent by the terminal device through the neighborhood awareness channel, such that the IoT device may interact with the terminal device at a reduced number of times to obtain the network configuration information of the gateway device, and the network configuration efficiency is improved. Further, in some embodiments, the IoT device may also activate the STA mode while the neighborhood awareness function is being activated, without the IoT device having to switch working modes a plurality of times. In addition, in the present disclosure, the terminal device obtains the network configuration information stored therein, such that the network configuration information may be obtained without invoking an underlying application. In this way, the obtained network configuration information may be sent directly to the terminal device through the neighborhood awareness channel in a media access control layer. In some embodiments, the network configuration information may be processed through an L2 layer (data link layer) of the terminal device, an L1 layer (physical layer) of the terminal device, an L1 layer (physical layer) of the IoT device, and an L2 layer (data link layer) of the IoT device, the number of layers through which the network configuration information passes may be reduced, such that time consumed for transmitting the network configuration information may be reduced.

BRIEF DESCRIPTION OF THE DRAWINGS

FIG. 1 is a flow chart of a method of network configuration for the IoT device according to some embodiments of the present disclosure.

FIG. 2 is a flow chart of a working process of a terminal device while the method of network configuration for the IoT device is being performed, according to some embodiments of the present disclosure.

FIG. 3 is a flow chart of a working process of an IoT device while the method of network configuration for the IoT device is being performed, according to some embodiments of the present disclosure.

FIG. 4 is a structural schematic view of an electronic device according to some embodiments of the present disclosure.

FIG. 5 is a structural schematic view of a computer storage medium according to some embodiments of the present disclosure.

DETAILED DESCRIPTION

In order to enable an ordinary skilled person in the art to better understand technical solutions of the present disclosure, a method and an apparatus for network configuration for an Internet of Things (IoT) device provided by the present disclosure is described in further detail below by referring to the accompanying drawings and specific embodiments.

The method of network configuration for the IoT device of the present disclosure may be applied in a case where the IoT device is connected to a cloud network for configuration for the first time after being manufactured, or in a case where the IoT device needs to be re-connected to the cloud network for configuration due to the network environment, where the IoT device is located, being changed. For these cases, taking domestic appliances as examples, a plurality of domestic appliances, such as a refrigerator, a microwave oven, an air conditioner, and a rice cooker, have Wi-Fi connection functions and remote control functions and may be treated as IoT devices. These IoT devices usually need a gateway device, such as a router, to be connected to a server to achieve connection of things. Therefore, the IoT devices need to obtain network configuration information of the gateway device, such as the router, firstly, to allow the IoT devices to be connected to the gateway device through the obtained network configuration information. However, currently, a process of "cloud connection and network configuration" of the IoT device is mainly achieved in a "SoftAP" manner. In this process, the terminal device needs to interact with the IoT device several times, and the IoT device needs to undergo two working mode switching processes, one working mode switching process is "from Idle to SoftAP", and the other working mode switching process is "from SoftAP to STA". Therefore, network configuration is less efficient.

Therefore, in the present disclosure, a neighborhood awareness technology is applied to the cloud connection and network configuration. In particular, the IoT device and the terminal device activates the neighborhood awareness function. The IoT device and the terminal device establish the neighborhood awareness channel. In this way, the IoT device may obtain the network configuration information of the gateway device sent by the terminal device through the neighborhood awareness channel, such that the IoT device may interact with the terminal device at a reduced number of times to obtain the network configuration information of the gateway device, and the network configuration efficiency is improved. Further, the IoT device may also activate the STA mode while the neighborhood awareness function is being activated, such that the IoT device does not need to switch working modes for a plurality of times.

At present, the terminal device generally obtains network configuration information input by a user through an input interface. Subsequently, the terminal device distributes and shares data based on a session mechanism triggered by an application layer. In this way, the network configuration information may be processed through the application layer of the terminal device, the representation layer of the terminal device, the session layer of the terminal device, the transmission layer of the terminal device, the network layer of the terminal device, the data link layer of the terminal device, the physical layer of the terminal device, the physical layer of the IoT device, the data link layer of the IoT device, and the network layer of the IoT device, and therefore, the network configuration information may be packaged by a plurality of layers to be sent, after being received, the packaged network configuration information may be parsed layer by layer. Operations are complicated, and more time may be consumed for transmitting data. Therefore, in the present disclosure, the terminal device obtains the network configuration information stored therein, such that the network configuration information may be obtained without invoking the underlying application. In this way, the obtained network configuration information may be sent directly to the terminal device through the neighborhood awareness channel in a media access control layer. The network configuration information may be processed through an L2 layer (data link layer) of the terminal device, an L1 layer (physical layer) of the terminal device, an L1 layer (physical layer) of the IoT device, and an L2 layer (data link layer) of the IoT device. The number of layers through which the network configuration information passes may be reduced, such that time consumed for transmitting the network configuration information may be reduced. In detail, as shown in FIG. 1, FIG. 1 is a flow chart of a method of network configuration for the IoT device according to some embodiments of the present disclosure. In the present embodiment, the method of network configuration for the IoT device includes following operations. To be noted that the following numbers are used to simplify the description only and shall not limit an order of performing the operations. The operations in the present embodiment may be performed in any order without contradicting technical concepts of the present disclosure.

In an operation S110, the terminal device establishes a neighborhood awareness channel with the IoT device.

The terminal device may firstly establish the neighborhood awareness channel with the IoT device, such that the terminal device may send the network configuration information of the gateway device to the IoT device through the neighborhood awareness channel. In this way, the IoT device may interact with the terminal device for a reduced number of times to obtain the network configuration information of the gateway device, and the network configuration efficiency is improved.

In some embodiments, the terminal device may obtain a neighborhood awareness network beacon of the IoT device, and subsequently, establish the neighborhood awareness channel with the IoT device based on the neighborhood awareness network beacon of the IoT device. That is, the terminal device and the IoT device may discover each other through the neighborhood awareness network beacon and establish the neighborhood awareness channel. In the present embodiment, the aforementioned neighborhood awareness network beacon may include at least one of the following: a telephone number, an integrated circuit card identity (ICCID), an international mobile equipment identity (IMEI), and so on, which will not be limited herein. The neighborhood awareness network beacon may further include a frequency band supported by the IoT device, a serial number, product information, and so on. The aforementioned neighborhood awareness network beacon may be carried by a NAN Beacon broadcast frame sent from the IoT device.

In another embodiment, the terminal device may send its own neighborhood awareness network beacon to the IoT device to allow the IoT device to obtain the neighborhood awareness network beacon of the terminal device, such that the IoT device may establish the neighborhood awareness channel with the terminal device based on the neighborhood awareness network beacon of the terminal device.

In another embodiment, the terminal device may establish a neighborhood awareness cluster with the IoT device to form the neighborhood awareness channel with the IoT device. Exemplarily, the terminal device may determine whether a neighborhood awareness cluster is available around the terminal device. In response to the neighborhood awareness cluster being available around the terminal device, the terminal device joins the cluster. In response to no neighborhood awareness cluster being available around the terminal device, the terminal device continues searching to determine whether the neighborhood awareness cluster being available around the terminal device. Correspondingly, the IoT device may scan, by using a Wi-Fi Aware function, an environment around the terminal device to determine whether the neighborhood awareness cluster is available around the terminal device. In response to the neighborhood awareness cluster being available around the terminal device, the terminal device joins the cluster. In response to no neighborhood awareness cluster being available around the terminal device, the terminal device may create a neighborhood awareness cluster. In this way, the IoT device and the terminal device may join a same neighborhood awareness cluster, and therefore, the neighborhood awareness channel may be formed between the IoT device and the terminal device to transmit information with each other.

It can be understood that, the terminal device may establish the neighborhood awareness channel with an IoT device immediately after the terminal device activates the Wi-Fi Aware function and after the IoT device activates the neighborhood awareness function. In addition, the neighborhood awareness channel may be maintained until either one of the terminal device or the IoT device deactivates the neighborhood awareness function. In this way, the terminal device and the IoT device may transmit information to each other through the neighborhood awareness channel. The user may activate the Wi-Fi-aware function of the terminal device by manual operations, by "NFC touch", or by any other way.

Of course, in other embodiments, the terminal device may autonomously determine whether the neighborhood awareness channel with the IoT device needs to be established. The terminal device performs the operation of establishing the neighborhood awareness channel with the IoT device when the terminal device determines that a current time point is an appropriate time point to establish the neighborhood awareness channel with the IoT device. In the present embodiment, it may be determined by various methods whether the current time point is the appropriate time point to establish the neighborhood awareness channel with the IoT device.

For example, the terminal device determines, by detecting whether the IoT device is unable to connect to the gateway device, whether the current time point is the appropriate time point to establish the neighborhood awareness channel with the IoT device. The terminal device determines that the current time point is the appropriate time point to establish the neighborhood awareness channel with the IoT device, in response to the IoT device being unable to connect to the gateway device. In this case, the terminal device may perform the operation of establishing the neighborhood awareness channel with the IoT device. In some embodiments, the terminal device may query device information of all devices already connected to the gateway device to determine whether the IoT device is among all the devices connected to the gateway device and to further determine whether the IoT device is connected to the gateway device. In other embodiments, the terminal device may query, from the server, whether the IoT device is offline. The IoT device being offline may indicate that the IoT device cannot be connected to the server via the gateway device, and that is, the IoT device cannot be connected to the gateway device.

In another example, the terminal device determines, by confirming whether the terminal device has received a neighborhood awareness channel establishing command, whether the current time point is the appropriate time point to establish the neighborhood awareness channel with the IoT device. In some embodiments, when the user knows that network configuration needs to be performed for the IoT device, the user may click on an IoT device status bar in the terminal device to cause the terminal device to obtain the "neighborhood awareness channel establishing command". In this way, the terminal device may determine that the current time point is the appropriate time point to establish the neighborhood awareness channel with the IoT device, and at this time point, the terminal device may perform the operation of establishing the neighborhood awareness channel with the IoT device. In particular, the above "IoT device status bar" may be shown in a list, such as a Wi-Fi list or a hotspot list, in the terminal device after the terminal device receives and parses the neighborhood awareness network beacon of the IoT device. Of course, in another embodiment, when the IoT device determines that network configuration needs to be performed for the IoT device, the IoT device may send the neighborhood awareness channel establishing command to the terminal device. In this way, the terminal device may respond to the neighborhood awareness channel establishing command to perform the operation of establishing the neighborhood awareness channel with the IoT device. In some embodiments, the neighborhood awareness channel establishing command sent by the IoT device may be the neighborhood awareness network beacon of the IoT device. That is, when the IoT devices confirms that network configure needs to be performed on the IoT device, the IoT device may directly send the neighborhood awareness network beacon of its own to the terminal device. The terminal device receives the neighborhood awareness network beacon of the IoT device, meaning that the terminal device obtains the neighborhood awareness channel establishing command. At this time point, the terminal device may directly establish the neighborhood awareness channel with the IoT device based on the neighborhood awareness network beacon obtained from the IoT device.

In addition, the terminal device needs to establish the neighborhood awareness channel with the IoT device. Therefore, the IoT device may be located within a radiation range of a hotspot of the terminal device. Therefore, generally, while configuring a network for the IoT device, the terminal device may be located near the IoT device.

In an operation S120, the terminal device obtains network configuration information of the gateway device stored in the terminal device.

After the terminal device establishes the neighborhood awareness channel with the IoT device, the terminal device may obtain the network configuration information of the gateway device stored in the terminal device, such that the terminal device may package and send the network configuration information at the media access control layer subsequently. In this way, data distribution and sharing based on the session mechanism triggered at the application layer may not be performed, and the time consumed for transmitting the network configuration information may be reduced.

It will be understood that the terminal device may obtain the stored network configuration information of the gateway device in various manners.

For example, the terminal device may scan a nearby network to determine a service set identifier (SSID) of a network of a current environment where the terminal device is located. Subsequently, the terminal device may look up, in a memory, information of a network to which the terminal device has been connected previously. The terminal device may match the SSID of the network of the current environment with the information of the network to which the terminal device has been connected previously, to find a SSID and a password of a network, which the terminal device has been connected to previously and is available in the current environment. In this way, in an operation S130, the found SSID and the password of the network, which the terminal device has been connected to previously and is available in the current environment, may be sent to the IoT device, ensuring that the IoT device may connect to the gateway device through the obtained network configuration information. Exemplarily, the terminal device scans nearby networks to determine that SSIDs of the current environment are meidi-5G, meidi-2.4G and TP-link 2.4G, and the terminal device looks up, in memory, to determine that the network information to which the terminal device has been connected previously is (meidi-2.4G, 123456), (TP-link-108, 846941), and (D-link-1482, 358624). The terminal device may perform matching and determines that the SSID and the password of the network, which the terminal device has been connected to previously and is available in the current environment, are meidi-2.4G and 123456 respectively.

The network configuration information of the gateway device stored in the terminal device is stored when the terminal is being connected to the gateway device based on the network configuration information. When the terminal device is unable to connect to the gateway device corresponding to the network configuration information through the stored network configuration information, the terminal device may delete the stored network configuration information. When the terminal device connects to the gateway device through a new network configuration information, the terminal device stores the new network configuration information to ensure that all network configuration information stored in the terminal device is always available, ensuring that the IoT device may connect to the gateway device through the obtained network configuration information. when the terminal device changes the configuration information of the gateway device, the terminal device may update an old network configuration information of the gateway device stored in the terminal device to a new network configuration information.

In another example, in the operation S110, the terminal device may first connect to the network of the current environment, and subsequently disconnects a connection with the gateway device corresponding to the network of the current environment to establish the neighborhood awareness channel with the IoT device. In this way, in the operation S120, the terminal device may obtain the network configuration information, which is of the gateway device that the terminal device has been successfully connected previously and is stored in the terminal device. In this way, in the operation S130, the terminal device may send the obtained network configuration information, which is of the gateway device that the terminal device has been successfully connected previously and is stored in the terminal device, to the IoT device to ensure that the IoT device may connect to the gateway device via the obtained network configuration information.

In an operation S130, the terminal device transmits the network configuration information to the IoT device at the media access control layer via the neighborhood awareness channel.

The terminal device obtains the network configuration information of the gateway device stored in the terminal device, packages the network configuration information at the media access control layer, and sends the packaged network configuration information, such that data distribution and sharing based on the session mechanism triggered by the application layer may not be performed, and time consumed for transmitting the network configuration information may be reduced.

In some embodiments, after the terminal device obtains the network configuration information of the gateway device stored in the terminal device, the terminal device may directly transmits the obtained network configuration information of the gateway device to the IoT device at the media access control layer via the neighborhood awareness channel.

Of course, in other embodiments, the terminal device may determine whether the obtained gateway configuration information of the gateway device matches the IoT device. In response to the obtained network configuration information of the gateway device matching the IoT device, the terminal device directly transmits the network configuration information of the gateway device to the IoT device. In response to the obtained network configuration information of the gateway device not matching the IoT device, the terminal device corrects the obtained network configuration information and transmits the confirmed new network configuration information to the IoT device. Exemplarily, before the operation S130, the terminal device may obtain a channel supported by the IoT device, and the obtained network configuration information of the gateway device stored in the terminal device may include the SSID of the gate device, the password of the gateway device, a channel of the gateway device, and so on. The terminal device may determine an operating frequency band of the gateway device based on the channel of the gateway device, and determine whether the operating channel of the gateway device is the same as the frequency band supported by the IoT device. In response to the operating channel of the gateway device being the same as the frequency band supported by the IoT device, the obtained network configuration information of the gateway device may be transmitted directly to the IoT device in the operation S130. In response to the operating channel of the gateway device being not the same as the frequency band supported by the IoT device, a candidate network identifier that fuzzily matches the SSID of the gateway device may be searched for, and the candidate network identifier and the password of the gateway device may be combined to form a new network configuration information. The new network configuration information may be transmitted to the IoT device via the neighborhood awareness channel. In addition, in order to allow the IoT device to connect to the gateway device even when the new network configuration information is not available but the network configuration information obtained at the operation S120 is available, the terminal device may transmit both the new network configuration information and the network configuration information obtained at the operation S120 to the IoT device. The frequency information supported by the IoT device may be transmitted to the terminal device via the neighborhood awareness network beacon of the IoT device described in the operation S110. The operation of searching for the candidate network identifier that fuzzily matches the SSID of the gateway device may include the following. The terminal device scans identifiers of nearby networks. The terminal device matches the identifiers of the nearby networks with the SSID of the gateway device to determine an identifier, from all scanned identifiers of the nearby networks, that can fuzzily match the SSID of the gateway device. Further, the terminal device may determine the identifier that fuzzily matches the SSID of the gateway device as the candidate network identifier.

In addition, the terminal device may send the network configuration information to the IoT device in a point-to-point manner via the neighborhood awareness channel. In other embodiments, the terminal device and at least one IoT device form the neighborhood awareness cluster. The terminal device may publish the network configuration information, and then the at least one IoT device may subscribe the network configuration information to obtain the network configuration information sent by the terminal device. In this way, network configuration may be performed for a plurality of IoT devices all at once by performing the network configuration method in the present disclosure.

Understandably, the terminal device may package the network configuration information into an information in a format specified by a neighborhood awareness network protocol. After a signal element structure and manufacturer identification fail to be accessed to the operating band of the network channel through the neighborhood awareness channel, the identifiers of networks sent by some gateway devices may carry operating band information, and therefore, the operating band of the accessed network channel may be determined as being the same as or not the same as the supported frequency band based on the accessed network identifiers. For example, when the accessed network identifier is a preset value, the accessed network identifier is meidi-5G, and the frequency band supported by the IoT device is 2.4 GHz. Since the accessed network identifier is the preset value, the IoT device cannot accurately identify the operating frequency band of the accessed network channel. Further, the frequency band supported by the IoT device 2.4 GHz, which is not the same as the operating band information 5G included in the accessed network identifier "meidi-5G". Therefore, based on the accessed network identifier, it can be determined that the operating band of the accessed network is not the same as the supported frequency band. Further, since the operating band information is generally located at a suffix of the network identifier, such as "meidi5 g", "meidi-5 g", "meidi-5 GHz", and so on, it may be determined whether the operating band of the accessed network is not the same as the supported band based on the suffix of the accessed network identifier.

Understandably, since the network identifiers sent by the gateway device may not necessarily carry the operating frequency band information, there may be a situation where the operating frequency band of the accessed network cannot be determined based on the accessed network identifier. Therefore, there may be a situation where the operating frequency band of the accessed network cannot be determined as being the same as or not the same as the supported frequency band based on the accessed network identifier. In order to allow IoT device to process operations easily, the case where the operating frequency band of the accessed network being the same as or not the same as the supported frequency band cannot be determined based on the accessed network identifier, is treated as the operating band of the accessed network being determined as being not the same as the supported band based on the accessed network identifier. Network configuration information whose field attributes conform to the neighborhood awareness network protocol specification is transmitted to the IoT device. The terminal device may package the network configuration information at the media access control layer to obtain the information in the format specified by the neighborhood awareness network protocol.

In an operation S140, the IoT device obtains the network configuration information of the gateway device from the terminal device at the media access control layer and through the neighborhood awareness channel.

The terminal device packages the network configuration information at the media access control layer and sends the packaged network configuration information. The IoT device may obtain the network configuration information at the media access control layer. In this way, the IoT device may connect to the gateway device via the obtained network configuration information.

In some embodiments, the IoT device may obtain network configuration information transmitted by a terminal device, which is located within a predetermined range of distance from the IoT device. The predetermined range of distance may be from 3 meters to 10 meters. The distance between the IoT device and the terminal device may be measured by a location function Round-Trip Time (WLAN RTT) of the IoT device. Specifically, the IoT device may send a measurement data packet to the terminal device. Further, time consumed for the measurement data packet traveling between the terminal device and the IoT device is calculated. The distance between the IoT device and the terminal device is calculated by multiplying the time by the speed of light. Of course, in other embodiments, the IoT device may obtain network configuration information transmitted from all terminal devices, and scan the network configuration information transmitted from all terminal devices sequentially, to try to connect to the gateway device.

In an operation S150, the IoT device is connected to the gateway device through the network configuration information.

After the IoT device obtains the network configuration information, the IoT device can connect to the gateway device via the network configuration information to complete the network configuration operation for the IoT device.

In some embodiments, after the IoT device obtains the network configuration information, the IoT device may directly scan the network configuration information in full channels. That is, the IoT device scans the network configuration information in all channels supported by the IoT device until the IoT device is connected to the gateway device or all channels have been scanned.

In other embodiments, the network configuration information obtained by the IoT device may include channels of the gateway device, and the IoT device may firstly scan the network configuration information in the channels of the gateway device. In response to the IoT device failing to connect to the gateway device in the channels of the gateway device, the IoT device may scan the network configuration information in full channels, until the IoT device is connected to the gateway device.

In addition, after scanning the network configuration information in full channels fails, the IoT device may wait for a preset period of time. After the preset period of time is passed, the IoT device rescans the network configuration information in order to try again to connect to the gateway device via the network configuration information. In response to the number of times of re-scanning reaching a threshold, current network configuration fails. A timer may be used to determine whether the preset period of time is reached, avoiding scanning blindly due to environmental issues. The preset period of time may be determined arbitrarily, such as 40 s.

In the present embodiment, the IoT device and the terminal device activate the neighborhood awareness function, and the IoT device and the terminal device establish the neighborhood awareness channel. Therefore, the IoT device may obtain the network configuration information of the gateway device sent by the terminal device through the neighborhood awareness channel, such that the IoT device may interact with the terminal device for a reduced number of times to obtain the network configuration information of the gateway device, the network distribution efficiency is improved. The IoT device may activate the STA mode while the neighborhood awareness function is being activated, such that the IoT device may always maintain the STA mode while the network configuration is being performed and may not have switch working modes for a plurality of times. The terminal device in the present disclosure obtains the network configuration information stored therein, so that the terminal device does not need to invoke the underlying application to obtain the network configuration information. The obtained network configuration information may be directly sent to the terminal device through the neighborhood awareness channel and via the media access control layer. The network configuration information may undergo the L2 layer (data link layer) of the terminal device, the L1 layer (physical layer) of the terminal device, the L1 layer (physical layer) of the IoT device, and the L2 layer (data link layer) of the IoT device. The number of layers that the network configuration information has to go through is reduced, and therefore, the time consumed for transmitting the network configuration information is reduced. The IoT device does not need to interact with the IoT device management application (such as Meijer) installed in the terminal device.

Further, according to the IoT device network configuration method of the present disclosure, after the IoT device is successfully connected to the server through the gateway device, the server may promptly send a "successful network configuration" information to the terminal device. The terminal device, in response to the command, may bind the IoT device to a user account entered by the user based on the successful network configuration information. In this way, the terminal device may take over an electrical control function, enabling the terminal device to control the IoT device remotely. The successful network configuration information may be directly sent to a control service applet embedded in commonly-used applications, such as "Alipay", "WeChat" or "Cloud Flash Pay" in the IoT device, or sent to "IoT Device Cloud Manager" or other IoT device vendor-specific applications. The user may experience the sense of technology and ease of control brought by IoT devices through the control service applet embedded in common applications in the IoT device or through the IoT device vendor-specific applications.

It is understood that, before binding the IoT device to the user account entered by the user in response to the confirmation command, the confirmation information of the IoT device may be obtained from the IoT device or the server, such that the IoT device may be bound to the user account entered by the user based on the confirmation information. The successful network configuration information or the neighborhood awareness network beacon may carry the confirmation information. The confirmation information mainly includes a SN of the IoT device, the distance between the IoT device and the terminal device (for "geo-fencing" determination), and so on.

After the terminal device has completes binding the IoT device to the user account, the terminal device may query whether the IoT device is online. In some embodiments, the terminal device may discover the IoT device from the gateway device or from the server via a device discovery mechanism to inform whether the IoT device is connected to the gateway device or connected to the server.

Specifically, the terminal device discovering the IoT device from the gateway device through the device discovery mechanism may indicate the following. The terminal device may search for the IoT device from the list of all devices connected to the gateway device. In addition, when the gateway device is connected to the server, and when the IoT device is successfully connected to the gateway device, the IoT device can connect to the server via the gateway device. In this case, the terminal device may check, from the server, whether the IoT device is online. The IoT device being online may indicate that the terminal device has discovered the IoT device from the server via the device discovery mechanism.

Specifically, the terminal device discovering the IoT device from the gateway device through the device discovery mechanism may indicate the following. The terminal device may search for the IoT device from the list of all devices connected to the gateway device. In addition, when the gateway device is connected to the server, and when the IoT device is successfully connected to the gateway device, the IoT device can connect to the server via the gateway device. In this case, the terminal device may check, from the server, whether the IoT device is online. The IoT device being online may indicate that the terminal device has discovered the IoT device from the server via the device discovery mechanism.

For the terminal device, the operations the method of performing network configuration for the IoT device are shown in FIG. 2, FIG. 2 is a flow chart of a working process of a terminal device while the method of network configuration for the IoT device is being performed, according to some embodiments of the present disclosure.

In an operation S210, the terminal device establishes the neighborhood awareness channel with the IoT device.

In an operation S220, the terminal device obtains the network configuration information of the gateway device stored in the terminal device.

In an operation S230, the terminal device transmits the network configuration information to the IoT device via the neighborhood awareness channel and at the media access control layer to allow the IoT device to connect to the gateway device via the network configuration information.

The above operations in this embodiment are similar to the relevant operations in some embodiments shown in FIG. 1 and will not be repeated in detail. The terminal device and the IoT device establish the neighborhood awareness channel, enabling the IoT device to obtain the network configuration information of the gateway device sent by the terminal device through the neighborhood awareness channel. In this way, the IoT device interacts with the terminal device for a reduced number of times to obtain the network configuration information of the gateway device, the network distribution efficiency is improved. The terminal device obtains the network configuration information stored in the terminal device, enabling the terminal device to send the obtained network configuration information directly to the terminal device through the media access control layer directly. The number of layers through which the network configuration information passes is reduced, and the time consumed for transmitting the network configuration information is reduced.

For the IoT device, the operations for performing the method of network configuration for the IoT device are shown in FIG. 3. FIG. 3 is a flow chart of a working process of an IoT device while the method of network configuration for the IoT device is being performed, according to some embodiments of the present disclosure.

In an operation S310, the IoT device establishes the neighborhood awareness channel with the terminal device.

The IoT device may be, for example, a smart domestic appliance, such as a refrigerator or an air conditioner. Network configuration information are stored in the IoT device in order to allow the IoT device to connect, when the IoT device is powered up, directly to the gateway device based on the network configuration information stored in the IoT device.

In an operation S320, the IoT device obtains the network configuration information of the gateway device from the terminal device at the media access control layer of the IoT device and via the neighborhood awareness channel.

In an operation S330, the IoT device is connected to the gateway device via the network configuration information.

In some embodiments, after the IoT device obtains the network configuration information, the IoT device may directly scan the network configuration information to connect to the gateway device. The network configuration information includes a channel of the gateway device. In response to connection to the gateway device by scanning the network configuration information fails, the operating frequency band of the gateway device may be identified based on the channel of the gateway device. In response to the frequency operating band not matching the frequency band supported by the IoT device, the candidate network identifier that fuzzy matches the SSID of the gateway device is searched for. The candidate network identifier is scanned, and connection is performed by taking the password in the network configuration information (i.e., the password of the gateway device), such that the IoT device is connected to the gateway device.

Specifically, the candidate network identifier that fuzzy matches the SSID of the gateway device may be searched for in various manners.

For example, the IoT device scans a SSID of a nearby network, determines similarity between the SSID of the nearby network and the SSID of the gateway device, and determines a SSID of the nearby network having a similarity greater than a threshold as the candidate network identifier.

In another example, the IoT device scans the SSID of the nearby network and determines N consecutive characters that are the same as the SSID of the gateway device as the candidate network identifier, where N≥2. Further, N consecutive characters in the SSID of the nearby network and the SSID, which is the same as "content that is in the SSID of the gateway device but is other than the operating band information", are used as the candidate network identifier.

In another example, the operating frequency band information in the SSID of the gateway device is modified to be the frequency band information supported by the IoT device, and the modified SSID is taken as the candidate network identifier. In an example, the operating frequency band accessed to the network channel is 5 GHz, the SSID of the gateway device is "meidi-5G", and the frequency band supported by the IoT device is 2.4 GHz. In this case, the candidate network identifier may be "meidi-2.4G", "meidi-2.4 GHz", "meidi-2.4 g", "meidi-2.4-G" or "meidi-2.4_G", and so on.

In response to the number of the determined candidate network identifiers being at least two, the at least two candidate network identifiers may be ranked based on the similarity between the candidate network identifiers and the SSID of the gateway device from a highest similarity to a lowest similarity. In this way, when the candidate network identifiers are scanned, the candidate network identifier having the high similarity to the SSID of the gateway device is scanned first, and the identifier having the low similarity to the SSID of the gateway device is scanned subsequently. Therefore, the IoT device may be connected to the gateway device faster, the efficiency of the IoT device accessing the network may be improved. That is, when scanning the candidate network identifiers and verifying the password of the gateway device, the candidate network identifiers and the password of the gateway device are scanned, where the candidate network identifiers are scanned one by one in an order from the candidate network identifier having the highest similarity to the candidate network identifier having the lowest similarity, until all candidate network identifiers are scanned or until the IoT device is successfully connected to the gateway device.

After scanning one candidate network identifier fails, the IoT device may wait for a preset period of time. When the preset period of time is passed, a next candidate network identifier is scanned, such that the IoT device tries to connect to the gateway device again. Further, when the preset period of time is passed, the IoT device may enter a network configuration pending mode, and a to-be-confirmed status may be recorded. Further, a module restarts, and after restarting, the next candidate network identifier is scanned. In addition, a timer may be used to determine whether the preset period of time has been reached, avoiding scanning blindly caused by environmental factors. The preset period of time may be determined arbitrarily, such as 40 s.

In addition, when identifying the operating frequency band of the gateway device based on the channel of the gateway device fails, the operating frequency band of the accessed network may be determined as being the same as or not the same as the frequency band supported by the IoT device based on the SSID of the gateway device. When the operating frequency band of the accessed network is not the same as the frequency band supported by the IoT device, a candidate network identifier that fuzzy matches the SSID of the gateway device is searched for.

Since the operating frequency band information is generally located at the suffix of the network identifier, such as "meidi5 g", "meidi-5 g", "meidi-5 GHz", and so on, the operating frequency band of the accessed network may be determined as being the same as or not the same as the frequency band supported by the IoT device based on the suffix of the accessed network identifier.

Understandably, since the network identifier sent by the gateway device may not necessarily carry the operating frequency band information, the operating frequency band of the accessed network may not be confirmed based on the accessed network identifier. Therefore, the operating frequency band of the accessed network being the same as or not the same as the frequency band supported by the IoT device may not be determined based on the accessed network identifier. In order to facilitate the IoT device to perform processing, the situation where the operating frequency band of the accessed network being the same as or not the same as the frequency band supported by the IoT device may not be determined based on the accessed network identifier, is classified as a situation where the operating frequency band of the accessed network is determined as being not the same as the frequency band supported by the IoT device based on the accessed network identifier.

The above operations are similar to the relevant operations in some embodiments shown in FIG. 1 and will not be repeated in detail. The IoT device and the terminal device establish the neighborhood awareness channel, enabling the IoT device to obtain the network configuration information of the gateway device sent by the terminal device through the neighborhood awareness channel. In this way, the IoT device interacts with the terminal device for a reduced number of times to obtain the network configuration information of the gateway device, the network configuration efficiency is improved. The IoT device obtains the network configuration information transmitted by the terminal device at the media access control layer. The number of layers through which the network configuration information passes is reduced, and therefore, the time consumed for transmitting the network configuration information is reduced.

The above-mentioned method of network configuration for the IoT device is implemented by an electronic device. The electronic device can be a terminal device, such as a mobile phone or a computer. The electronic device may alternatively be an IoT device, such as a smart appliance such as a refrigerator, an air conditioner, a rice cooker or a microwave oven.

As shown in FIG. 4, FIG. 4 is a structural schematic view of an electronic device according to some embodiments of the present disclosure. The present electronic device 10 includes a processor 12. The processor 12 is configured to execute instructions to implement the voice interaction method described above. Specific implementation process may be referred to the above description, which will not be repeated here. The electronic device 10 is capable of improving the efficiency of network configuration for the IoT device.

The processor 12 may also be referred to as a Central Processing Unit (CPU). The processor 12 may be an integrated circuit chip having signal processing capability. The processor 12 may also be a general purpose processor, a digital signal processor (DSP), an application specific integrated circuit (ASIC), a field programmable gate array (FPGA) or other programmable logic device, a discrete gate or transistor logic device, a discrete hardware component. The general purpose processor may be a microprocessor, or the processor 12 may be any conventional processor and the like.

The voice device 10 may further include a memory 11 for storing instructions and data required to allow the processor 12 to operate.

The processor 12 is configured to execute instructions to implement the method provided in any of the above embodiments and any non-conflicting combinations of the methods of network configuration for the IoT device of the present disclosure.

As shown in FIG. 5, FIG. 5 is a structural schematic view of a computer storage medium according to some embodiments of the present disclosure. In the present disclosure, the computer readable storage medium 20 stores instruction/program data 21. The instruction/program data 21, when being executed, are configured to implement the method provided in any of the embodiments and any non-conflicting combination of the voice interaction methods of the present disclosure. In particular, the instructions/program data 21 may be stored in the aforementioned storage medium 20 as a program file in the form of a software product to enable a computer device (which may be a personal computer, a server, or a network device) or processor to perform all or some of the operations of the methods in the various embodiments of the present disclosure. The aforementioned storage medium 20 includes various media that can store program codes, such as a USB stick, a removable hard disk, a read-only memory (ROM), a random access memory (RAM), a disk or a CD-ROM, or a terminal device such as a computer, a server, a mobile phone, a tablet computer, and so on.

In the several embodiments provided in this disclosure, it should be understood that the system, the device and the method may be implemented in other ways. For example, the device in the described embodiments above are merely schematic. For example, units are divided based on logical functions, but may be in another way when actually implemented. For example, multiple units or components can be combined or can be integrated into another system, or some features can be omitted or not implemented. On another point, mutual coupling or direct coupling or communicative connection shown or discussed in the above may be indirect coupling or communicative connection between devices and units may be achieved via some interfaces, which may be electrical, mechanical or in other types.

Alternatively, individual functional units in various embodiments of the present disclosure may be integrated in one processing unit, or the units may be physically present separately, or two or more units may be integrated in one unit. The above integrated units can be implemented either in the form of hardware or in the form of software functional units.

The above shows only embodiments of the present disclosure and is not intended to limit the scope of the present disclosure. Any equivalent structure or equivalent process transformation performed based on the specification and the accompanying drawings of the present disclosure, applied directly or indirectly in other related fields, shall be equally covered by the scope of the present disclosure.

What is claimed is:

1. A method of network configuration for an Internet of Things (IoT) device, comprising:
   establishing a neighborhood awareness channel between a terminal device and the IoT device;
   obtaining, by the terminal device, network configuration information of a gateway device stored in the terminal device wherein the network configuration information is stored in the memory of the terminal device; and
   transmitting, by the terminal device at a media access control layer, the network configuration information to the IoT device through the neighborhood awareness channel to allow the IoT device to connect to the gateway device via the network configuration information, wherein transmitting the network configuration information to the IoT device comprises:
      determining, by the terminal device, whether the obtained network configuration information of the gateway device matches the IoT device;
      transmitting directly, by the terminal device, in response to the obtained network configuration information of the gateway device matching the IoT device, the network configuration information of the gateway device to the IoT device; and
      correcting, by the terminal device, in response to the obtained network configuration information of the gateway device not matching the IoT device, the obtained network configuration information and transmits the confirmed new network configuration information to the IoT device.

2. The method according to claim 1, wherein transmitting, by the terminal device at the media access control layer, the network configuration information to the IoT device through the neighborhood awareness channel comprises:
   packaging, by the terminal device, the network configuration information at the media access control layer into information in a format specified by a neighborhood awareness network protocol; and
   transmitting, by the terminal device at the media access control layer, the information to the IoT device via the neighborhood awareness channel.

3. The method according to claim 1, wherein establishing the neighborhood awareness channel between the terminal device and the IoT device comprises:
   obtaining, by the terminal device, a neighborhood awareness network beacon broadcasted by the IoT device; and establishing, by the terminal device, the neighborhood awareness channel with the IoT device based on the neighborhood awareness network beacon.

4. The method according to claim 1, wherein prior to establishing the neighborhood awareness channel between the terminal device and the IoT device, the method further comprises: connecting the terminal device to the gateway device that is scannable by the IoT device; and establishing the neighborhood awareness channel between the terminal device and the IoT device comprises: disconnecting the terminal device from the gateway device and establishing the neighborhood awareness channel with the IoT device; and obtaining, by the terminal device, network configuration information of the gateway device stored in the terminal device comprises: obtaining, by the terminal device, network configuration information of a gateway device connected to the terminal device in a previous connection, wherein the network configuration information is stored in the terminal device.

5. The method according to claim 1, wherein obtaining, by the terminal device, network configuration information of a gateway device stored in the terminal device comprises:

scanning, by the terminal device, a service set identifier of a surrounding network;

obtaining, by the terminal device, network configuration information of at least one gateway device stored in the terminal device; and matching, by the terminal device, the service set identifier of the surrounding network with the network configuration information of the at least one gateway device to determine one network configuration information from the network configuration information of the at least one gateway device, wherein the determined one network configuration information is usable in a current environment; and transmitting, by the terminal device at the media access control layer, the network configuration information to the IoT device through the neighborhood awareness channel comprises: transmitting, by the terminal device, the network configuration usable in the current environment to the IoT device.

6. The method according to claim 5, wherein, the network configuration information comprises a service set identifier of the gateway device, a password of the gateway device, and a channel of the gateway device;

prior to transmitting, by the terminal device at the media access control layer, the network configuration information to the IoT device through the neighborhood awareness channel, the method further comprises: obtaining, by the terminal device, a frequency band supported by the IoT device; and transmitting, by the terminal device at the media access control layer, the network configuration information to the IoT device through the neighborhood awareness channel, comprises:

determining, by the terminal device, an operating frequency band of the gateway device based on the channel of the gateway device;

in accordance with a determination that the operating frequency band of the gateway device is different from the frequency band supported by the IoT device:

searching, by the terminal device, for a candidate network identifier that fuzzy matches the service set identifier of the gateway device;

forming a new network configuration information based on the candidate network identifier and the password of the gateway device, and transmitting the new network configuration information to the IoT device via the neighborhood awareness channel.

7. The method according to claim 1, further comprising:

obtaining, by the terminal device, information about a successful network configuration from a server; and binding, by the terminal device in accordance with a confirmation command, the IoT device to a user account based on the information of the successful network configuration, to enable the terminal device to remotely control the IoT device.

8. The method according to claim 1, further comprising:

obtaining, by the IoT device at a media access control layer of the IoT device, network configuration information from the terminal device through the neighborhood awareness channel; and connecting the IoT device to the gateway device via the network configuration information.

9. The method according to claim 8, wherein obtaining, by the IoT device at the media access control layer of the IoT device, network configuration information from the terminal device through the neighborhood awareness channel comprises:

obtaining, by the IoT device, information in a format specified by a neighborhood awareness network protocol from the terminal device via the neighborhood awareness channel;

obtaining, by the IoT device, the network configuration information by parsing the information at the media access control layer; and connecting the IoT device to the gateway device via the network configuration information comprises: connecting the IoT device to the gateway device at the media access control layer via the network configuration information.

10. The method according to claim 8, wherein establishing a neighborhood awareness channel between the terminal device and the IoT device comprises:

broadcasting, by the IoT device, a neighborhood awareness network beacon to establish the neighborhood awareness channel with the terminal device located within a broadcast range of the IoT device.

11. The method according to claim 10, further comprising: prior to broadcasting, by the IoT device, a neighborhood awareness network beacon: activating, by the IoT device, a neighborhood awareness network function while maintaining a station mode.

12. The method according to claim 8, wherein the network configuration information comprises a service set identifier of the gateway device, a password of the gateway device, and a channel of the gateway device; and connecting the IoT device to the gateway device via the network configuration information comprises:

scanning, by the IoT device, the service set identifier of the gateway device in the channel of the gateway device and verifying the password of the gateway device;

in accordance with a determination that the IoT device fails to connect to the gateway device, scanning, by the IoT device, the service set identifier of the gateway device in full channels and verifying the password of the gateway device to reconnect to the gateway device.

13. A method of network configuration for an Internet of Things (IoT) device, comprising:

establishing a neighborhood awareness channel between a terminal device and the IoT device;

obtaining, by the terminal device, network configuration information of a gateway device stored in the terminal device; and transmitting, by the terminal device at a media access control layer, the network configuration information to the IoT device through the neighborhood awareness channel to allow the IoT device to connect to the gateway device via the network configuration information;

wherein prior to establishing the neighborhood awareness channel between the terminal device and the IoT device, the method further comprises: connecting the terminal device to the gateway device that is scannable by the IoT device; and establishing the neighborhood awareness channel between the terminal device and the IoT device comprises: disconnecting the terminal device from the gateway device and establishing the neighborhood awareness channel with the IoT device; and obtaining, by the terminal device, network configuration information of the gateway device stored in the terminal device comprises: obtaining, by the terminal device, network configuration information of a gateway device connected to the terminal device in a previous connection, wherein the network configuration information is stored in the terminal device, wherein the network configuration information comprises a service set identifier of the gateway device, a password of the gateway device, and a channel of the gateway device;

prior to transmitting, by the terminal device at the media access control layer, the network configuration information to the IoT device through the neighborhood awareness channel, the method further comprises: obtaining, by the terminal device, a frequency band supported by the IoT device; and transmitting, by the terminal device at the media access control layer, the network configuration information to the IoT device through the neighborhood awareness channel comprises:

determining, by the terminal device, an operating frequency band of the gateway device based on the channel of the gateway device;

in accordance with a determination that the operating frequency band of the gateway device is different from the frequency band supported by the IoT device:

searching, by the terminal device, for a candidate network identifier that fuzzy matches the service set identifier of the gateway device; and forming a new network configuration information based on the candidate network identifier and the password of the gateway device, and transmitting the new network configuration information to the IoT device via the neighborhood awareness channel.

14. An electronic device, comprising: a processor, wherein the processor is configured to execute instructions to perform operations of:

establishing a neighborhood awareness channel between a terminal device and the IoT device;

obtaining, by the terminal device, network configuration information of a gateway device stored in the terminal device wherein the network configuration information is stored in the memory of the terminal device; and transmitting, by the terminal device at a media access control layer, the network configuration information to the IoT device through the neighborhood awareness channel to allow the IoT device to connect to the gateway device via the network configuration information, wherein transmitting the network configuration information to the IoT device comprises:

determining, by the terminal device, whether the obtained network configuration information of the gateway device matches the IoT device;

transmitting directly, by the terminal device, in response to the obtained network configuration information of the gateway device matching the IoT device, the network configuration information of the gateway device to the IoT device; and correcting, by the terminal device, in response to the obtained network configuration information of the gateway device not matching the IoT device, the obtained network configuration information and transmits the confirmed new network configuration information to the IoT device.

15. The electronic device according to claim 14, wherein transmitting, by the terminal device at the media access control layer, the network configuration information to the IoT device through the neighborhood awareness channel comprises:

packaging, by the terminal device, the network configuration information at the media access control layer into information in a format specified by a neighborhood awareness network protocol; and transmitting, by the terminal device at the media access control layer, the information to the IoT device via the neighborhood awareness channel.

16. The electronic device according to claim 14, wherein establishing the neighborhood awareness channel between the terminal device and the IoT device comprises:

obtaining, by the terminal device, a neighborhood awareness network beacon broadcasted by the IoT device; and establishing, by the terminal device, the neighborhood awareness channel with the IoT device based on the neighborhood awareness network beacon.

17. The electronic device according to claim 14, wherein prior to establishing the neighborhood awareness channel between the terminal device and the IoT device, the method further comprises: connecting the terminal device to a gateway device that is scannable by the IoT device; and establishing the neighborhood awareness channel between the terminal device and the IoT device comprises: disconnecting the terminal device from the gateway device and establishing the neighborhood awareness channel with the IoT device; and obtaining, by the terminal device, network configuration information of the gateway device stored in the terminal device, comprises: obtaining, by the terminal device, network configuration information of a gateway device, which is the successfully connected to the terminal device in a previous connection, wherein the network configuration information is stored in the terminal device.

18. The electronic device according to claim 14, wherein obtaining, by the terminal device, network configuration information of a gateway device stored in the terminal device, comprises:

scanning, by the terminal device, a service set identifier of a surrounding network;

obtaining, by the terminal device, network configuration information of at least one gateway device stored in the terminal device; and matching, by the terminal device, the service set identifier of the surrounding network with the network configuration information of the at least one gateway device to determine one network configuration information from the network configuration information of the at least one gateway device, wherein the determined one network configuration information is usable in a current environment; and transmitting, by the terminal device at the media access control layer, the network configuration information to the IoT device through the neighborhood awareness channel, comprises: transmitting, by the terminal device, the network configuration usable in the current environment to the IoT device.

19. The electronic device according to claim 17, wherein the network configuration information comprises a service set identifier of the gateway device, a password of the gateway device, and a channel of the gateway device;

prior to transmitting, by the terminal device at the media access control layer, the network configuration information to the IoT device through the neighborhood awareness channel, the method further comprises: obtaining, by the terminal device, a frequency band supported by the IoT device; and transmitting, by the terminal device at the media access control layer, the network configuration information to the IoT device through the neighborhood awareness channel, comprises:

determining, by the terminal device, an operating frequency band of the gateway device based on the channel of the gateway device;

in accordance with a determination that the operating frequency band of the gateway device is different from the frequency band supported by the IoT device:

searching, by the terminal device, for a candidate network identifier that fuzzy matches the service set identifier of the gateway device; and forming a new network configuration information based on the candidate network identifier and the password of the gateway device, and transmitting the new network configuration information to the IoT device via the neighborhood awareness channel.

20. The electronic device according to claim 18, wherein the network configuration information comprises a service set identifier of the gateway device, a password of the gateway device, and a channel of the gateway device;

prior to transmitting, by the terminal device at the media access control layer, the network configuration information to the IoT device through the neighborhood awareness channel, the method further comprises: obtaining, by the terminal device, a frequency band supported by the IoT device; and transmitting, by the terminal device at the media access control layer, the network configuration information to the IoT device through the neighborhood awareness channel, comprises:

determining, by the terminal device, an operating frequency band of the gateway device based on the channel of the gateway device;

in accordance with a determination that the operating frequency band of the gateway device is different from the frequency band supported by the IoT device:

searching, by the terminal device, for a candidate network identifier that fuzzy matches the service set identifier of the gateway device; and forming a new network configuration information based on the candidate network identifier and the password of the gateway device, and transmitting the new network configuration information to the IoT device via the neighborhood awareness channel.

* * * * *